(12) United States Patent
Biesheuvel et al.

(10) Patent No.: US 11,925,923 B2
(45) Date of Patent: Mar. 12, 2024

(54) PULSED COMPRESSION REACTORS AND METHODS FOR THEIR OPERATION

(71) Applicant: Dow Global Technologies LLC, Midland, MI (US)

(72) Inventors: Cornelis Biesheuvel, Terneuzen (NL); Adrianus C. De Kok, Terneuzen (NL); Hendrik L. Pelt, Ophemert (NL); Wim M. Kamperman, Terneuzen (NL)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/887,701

(22) Filed: Aug. 15, 2022

(65) Prior Publication Data

US 2022/0387950 A1 Dec. 8, 2022

Related U.S. Application Data

(62) Division of application No. 16/758,663, filed as application No. PCT/US2018/057211 on Oct. 24, 2018, now Pat. No. 11,446,619.

(Continued)

(51) Int. Cl.
*B01J 3/02* (2006.01)
*B01J 3/00* (2006.01)
(Continued)

(52) U.S. Cl.
CPC ............... *B01J 3/042* (2013.01); *B01J 3/002* (2013.01); *B01J 3/02* (2013.01); *B01J 19/185* (2013.01)

(58) Field of Classification Search
None
See application file for complete search history.

(56) References Cited

U.S. PATENT DOCUMENTS

| | | | |
|---|---|---|---|
| 1,429,035 | A | 9/1922 | Humphrey |
| 1,586,508 | A | 5/1926 | Brutzkus |

(Continued)

FOREIGN PATENT DOCUMENTS

| | | |
|---|---|---|
| CN | 107698012 A | 2/2018 |
| DE | 3434980 A1 | 6/1985 |

(Continued)

OTHER PUBLICATIONS

Roestenberg et al., "Heat transfer study of the pulsed compression reactor", Chemical Engineering Science, 2010, 65, 88-91.
(Continued)

*Primary Examiner* — Jennifer A Leung
(74) *Attorney, Agent, or Firm* — Dinsmore & Shohl LLP

(57) ABSTRACT

A pulsed compression reactor may include a reactor housing, a spring piston, and a driver piston. The reactor housing may define an interior volume, and may include a first passage and a second passage which lead to the interior volume. The spring piston may be positioned within the interior volume, wherein the spring piston and the reactor housing at least partially define a perimeter of a gas spring buffer chamber within the interior volume. The driver piston may be positioned within the interior volume, wherein the spring piston, the driver piston, and the reactor housing at least partially define a perimeter of a reaction chamber within the interior volume.

8 Claims, 10 Drawing Sheets

Related U.S. Application Data

(60) Provisional application No. 62/576,369, filed on Oct. 24, 2017.

(51) Int. Cl.
  *B01J 3/04* (2006.01)
  *B01J 19/18* (2006.01)

(56) References Cited

U.S. PATENT DOCUMENTS

| | | | |
|---|---|---|---|
| 2,814,551 A | 11/1957 | Broeze et al. | |
| 2,814,552 A | 11/1957 | Van Dijck | |
| 2,898,199 A * | 8/1959 | Scott, Jr. ................. | B01J 3/08 422/127 |
| 3,869,241 A | 3/1975 | David et al. | |
| 4,595,566 A * | 6/1986 | Byrd ..................... | B01F 33/823 366/267 |
| 4,841,921 A | 6/1989 | Yang | |
| 5,579,682 A | 12/1996 | Bergman et al. | |
| 6,206,658 B1 | 3/2001 | Nishioka et al. | |
| 7,064,705 B2 | 6/2006 | Johannessen | |
| 7,670,120 B2 | 3/2010 | Ginies et al. | |
| 7,708,536 B2 | 5/2010 | Ginies et al. | |
| 8,104,436 B2 | 1/2012 | Gray, Jr. | |
| 8,578,894 B2 | 11/2013 | McKraig et al. | |
| 8,691,079 B2 | 4/2014 | Iaccino | |
| 8,857,173 B2 | 10/2014 | Beale | |
| 8,997,699 B2 | 4/2015 | Roelle et al. | |
| 9,057,268 B2 | 6/2015 | Lindsey | |
| 9,169,773 B2 | 10/2015 | Bromberg et al. | |
| 11,136,252 B2 | 10/2021 | Wu | |
| 2002/0081223 A1 * | 6/2002 | Ikuta ..................... | F04B 7/0007 417/491 |
| 2008/0000215 A1 | 1/2008 | Duncan | |
| 2009/0208389 A1 | 8/2009 | Holl | |
| 2016/0195074 A1 * | 7/2016 | Beard ..................... | F04B 13/02 417/500 |
| 2018/0297855 A1 * | 10/2018 | Hughes ................... | B01J 19/18 |

FOREIGN PATENT DOCUMENTS

| | | | |
|---|---|---|---|
| GB | 1334844 A | 10/1973 | |
| GB | 1505030 A | 3/1978 | |
| JP | 05057181 A * | 3/1993 | ............ B01J 19/18 |
| RU | 2097121 C1 | 11/1997 | |
| RU | 2115467 C1 | 7/1998 | |
| RU | 2142844 C1 | 12/1999 | |
| RU | 2536500 C1 | 8/2014 | |
| RU | 2013103951 A | 8/2014 | |
| WO | 9428745 A1 | 12/1994 | |
| WO | 2010025288 A1 | 3/2010 | |

OTHER PUBLICATIONS

Roestenberg et al., "On the controllability and run-away possibility of a totally free piston, pulsed compression reactor", Chemical Engineering Science, 2010, 65, 49.

Roestenberg et al., "Experimental study and simulation of syngas generation from methane in the Pulsed Compression Reactor", Fuel, 2011, 90, 1875-1883.

Roestenberg et al., "Steam reforming of methane by rapid compression expansion", Fuel, 2012, 94, 298-304.

International Search Report and Written Opinion pertaining to PCT/US2018/057211, dated May 24, 2019.

Chinese Search Report dated Sep. 24, 2021, pertaining to Chinese Application No. 201880066912.5.

Chinese Office Action dated Sep. 24, 2021, pertaining to Chinese Application No. 201880066912.5.

Chinese Search Report dated Apr. 7, 2022, pertaining to Chinese Application No. 201880066912.5.

Chinese Office Action dated Apr. 22, 2022, pertaining to Chinese Application No. 201880066912.5.

Brazil Technical Report. dated Sep. 20, 2022. pertaining to application No. BR112020007209-5, 7 pages.

Communication pursuant to Article 94(3) EPC, dated Mar. 13, 2023, pertaining to European Patent Application No. 18800800.7 4 pages.

\* cited by examiner

PULSED COMPRESSION REACTORS AND METHODS FOR THEIR OPERATION

CROSS REFERENCE TO RELATED APPLICATION

The present application is a division of U.S. patent application Ser. No. 16/758,663, filed Apr. 23, 2020, which claims the benefit of International Patent Application No. PCT/US2018/057211, filed Oct. 24, 2018, which claims the benefit of U.S. Provisional Application Ser. No. 62/576,369, filed Oct. 24, 2017, all of which are hereby incorporated by reference in their entireties.

BACKGROUND

Field

The present disclosure generally relates to chemical processing, and more specifically, to reactor designs and methods utilized in pulsed compression processing.

Technical Background

Some reactions may require high temperatures and/or high pressures. Utilizing these reaction conditions (i.e., high temperature and/or high pressure) may require relatively high costs in manufacturing the particular chemical product. As such, improved reactors and the methods for forming chemical products in these reactors are needed.

BRIEF SUMMARY

According to one or more embodiments disclosed herein, a pulsed compression reactor may be suitable for producing chemical products where formation is caused by exposure to high temperatures and high pressures. A pulsed compression reactor may utilize a piston to adiabatically compress a reactant within a chamber by reducing the volume of the chamber. Following compression of the reactant, the pulsed compression reactor may decompress the reactant to form the product. The reaction chamber for a pulsed compression reactor may experience very high temperatures and pressures, such as temperatures of at least 500° C. and/or pressures of at least 50 MPa. Without being bound by theory, these reaction conditions may allow for the formation of destabilized molecules, such as free radicals, which may form product molecules when pressure is reduced, sometimes referred to as quenching. The decompression in the pulsed compression reactor may "freeze" the destabilized molecular components into new arrangement, thus forming the product chemicals. For example, and without limitation, a pulsed compression reactor may be utilized for the formation of light olefins such ethylene from methane. The methane may form radicals when compressed, and may freeze as ethylene when expanded.

Several problems with the operation of pulsed compression reactors have been herein identified. Without limitation, existing problems with pulsed compression reactors include the inability for a safe start, continued operation, and stop of a pulsed compression reactor; mixing of reactant and product molecules; inability to control the pulsed compression reactor at high stroke rates; and piston wear resulting in loss of performance and/or gas seal leakage. These problems, among others, have been addressed by the embodiments of pulsed compression reactors described herein. Without being bound by theory, it is believed the pulsed compression reactors and methods for the operation thereof disclosed herein overcome at least some of these identified problems. For example, the use of a rotor and stator to control fluid flow into the gas chambers of the pulsed compression reactor may allow for safe start, continued operation, and stop. The use of the rotor and stator and/or the use of multiple pistons in the pulsed compression reactors disclosed herein may also allow for the pulsed compression reactor to operate without substantial mixing of the reactant and product gases. Additionally, the rotor and stator design may allow for control of the pulsed compression reactor at high stroke rates. Also, the controlled rotational velocity, such as a non-constant angular velocity of the rotor, may reduce wear of the pistons.

According to one or more embodiments, a pulsed compression reactor may comprise a reactor housing comprising a rotor and a stator, the rotor comprising an interior volume, wherein the rotor spins on a central axis of the reactor housing, and wherein the rotor comprises at least a first passage in fluid communication with the interior volume; and one or more pistons positioned in the interior volume and adapted to translate in the direction of the central axis; wherein the first passage aligns with one or more passages in the stator as the rotor spins on the central axis to allow for fluid communication between the stator and the interior volume.

According to another embodiment, a pulsed compression reactor may comprise a reactor housing comprising a rotor and a stator, the rotor comprising an interior volume, wherein the rotor spins on a central axis of the reactor housing, and wherein the rotor comprises at least a first passage in fluid communication with the interior volume; one or more pistons positioned in the interior volume and adapted to translate in the direction of the central axis; wherein the rotor spins in a direction and the one or more pistons spin in the same direction, and wherein the rotor spins at a non-constant velocity.

It is to be understood that both the foregoing brief summary and the following detailed description present embodiments of the technology, and are intended to provide an overview or framework for understanding the nature and character of the technology as it is claimed. The accompanying drawings are included to provide a further understanding of the technology, and are incorporated into and constitute a part of this specification. The drawings illustrate various embodiments and, together with the description, serve to explain the principles and operations of the technology. Additionally, the drawings and descriptions are meant to be merely illustrative, and are not intended to limit the scope of the claims in any manner.

Additional features and advantages of the technology disclosed herein will be set forth in the detailed description which follows, and in part will be readily apparent to those skilled in the art from that description or recognized by practicing the technology as described herein, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 1:
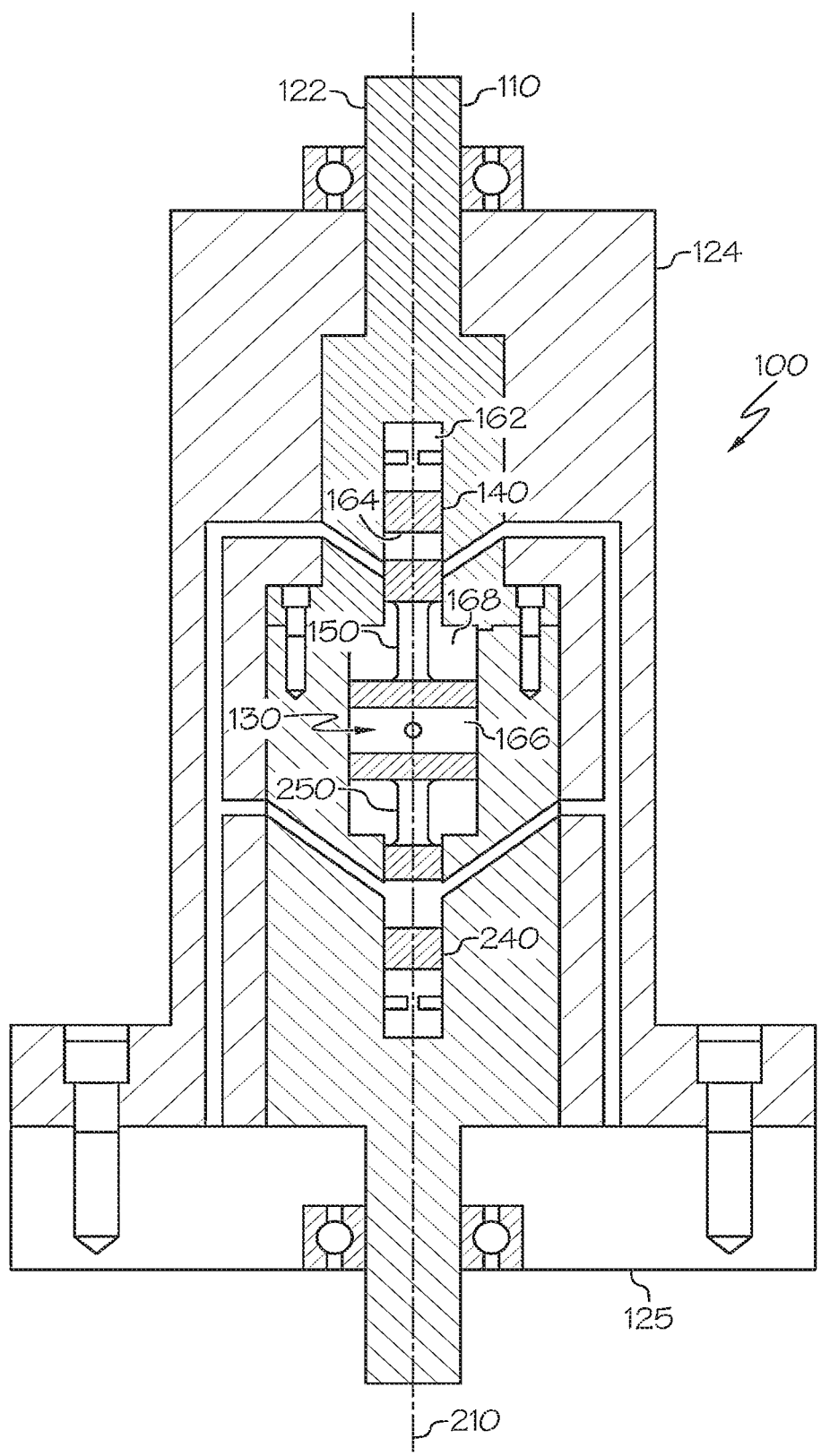
FIG. 1 schematically depicts a cross-sectional side view of a pulsed compression reactor, according to one or more embodiments described herein.

Embodiments related to pulsed compression reactors and methods for the operation of pulsed compression reactors are disclosed herein. Now referring to FIGS. 1 and 2, a pulsed compression reactor 100 may comprise a reactor housing 110 that may define an interior volume 130. For example, the reactor housing 110 may form one or more sides of the perimeter of the interior volume 130. The interior volume 130 may generally be an open area (e.g., a cavity) within the reactor housing 110. According to one or more embodiments, the reactor housing 110 may comprise a rotor 122 and a stator 124. The rotor 122 may define the interior volume 130 and be at least partially surrounded by the stator 124. For example, as depicted in FIG. 1, the rotor 122 is generally in the interior of the pulsed compression reactor 100 and the stator 124 is positioned around the rotor 122. However, it should be understood that some embodiments disclosed herein may not include a rotor 122 and a stator 124. For example, the reactor housing 110 may be a unitary body. According to one or more embodiments, the stator 124 may be attached to a baseplate 125. The stator 124 may include a baseplate 125 may provide mechanical support and/or stability for the other portions of the stator 124. The baseplate 125 may include a cylindrical opening such as to allow for the rotor 122 to be aligned with the baseplate 125 such that the rotor 122 may spin in an interior region of the baseplate 125, as depicted in FIG. 1.

As is discussed in detail herein, the rotor 122 may be operable to rotate around the central axis 210 of the pulsed compression reactor 100, while the stator 124 may not appreciably move (i.e., the stator 124 may be static). According to one or more embodiments, the movement of the rotor 122 may close and/or open passages which lead from the interior volume 130, through the rotor 122, and into the stator 124.

Figure 2:
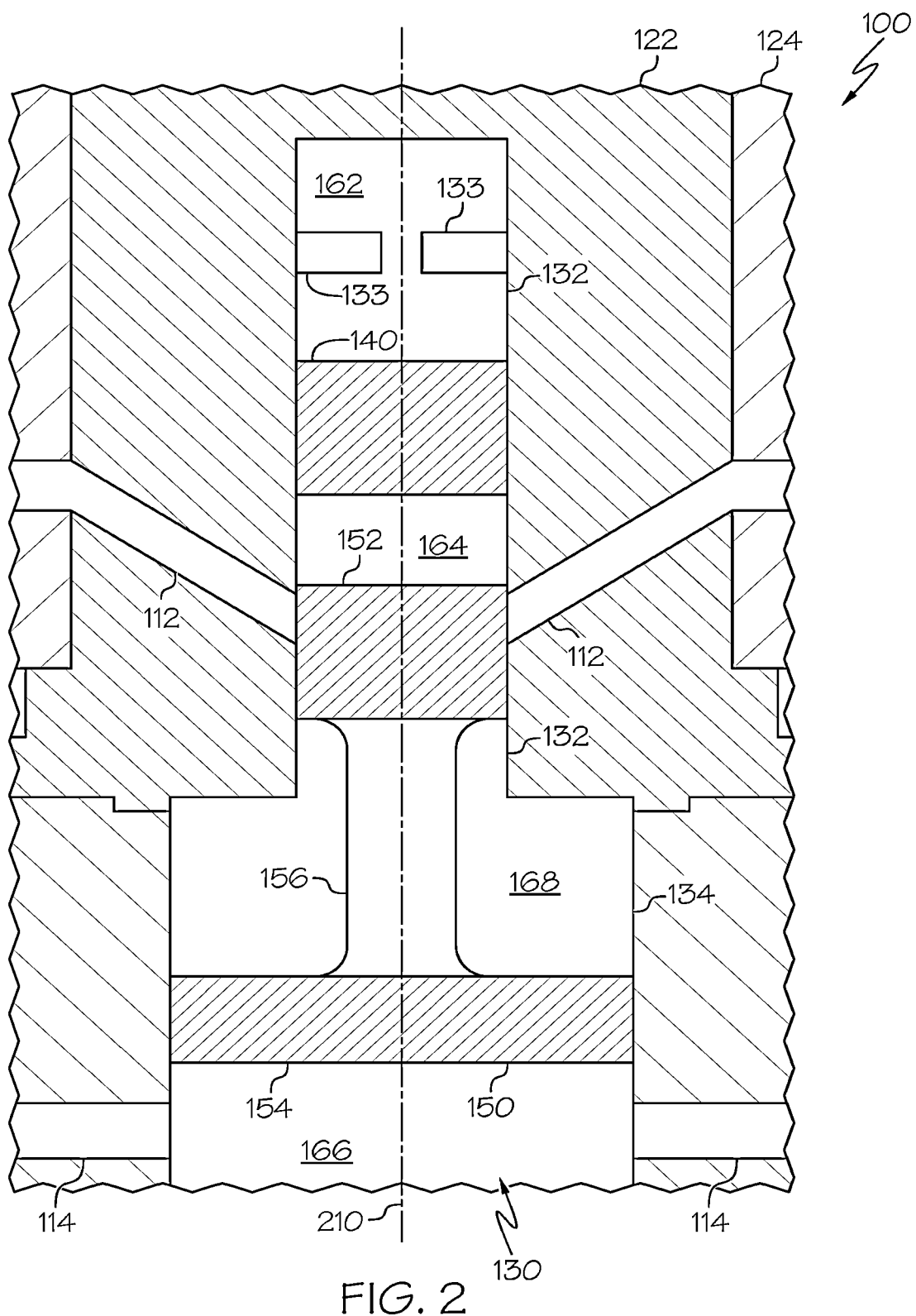
FIG. 2 schematically depicts an enlarged cross-sectional side view of the pulsed compression reactor of FIG. 1, according to one or more embodiments described herein.

According to one or more embodiments, the reactor housing 110 may comprise an upper passage 112 (sometimes referred to herein as a first passage) and a lower passage 114 (sometimes referred to herein as a second passage) which each lead to the interior volume 130. As depicted in FIG. 2, the upper passage 112 and the lower passage 114 may be disposed in the rotor 122. Complementary passages in the stator 124 may align with the upper passage 112 and/or lower passage 114 to provide fluid communication from the interior volume 130 to the stator 124. Example embodiments of such complementary passages are described in detail with reference to FIGS. 3-10, described below.

The interior volume 130 may comprise an upper portion 132 (sometimes referred to herein as a first portion) and a lower portion 134 (sometimes referred to herein as a second portion) adjacent the upper portion 132. The upper portion 132 of the interior volume 130 may have a cylindrical perimeter, and the lower portion 134 of the interior volume 130 may also have a cylindrical perimeter. The diameter of the upper portion 132 may be less than the diameter of the lower portion 134. The upper passage 112 may connect to the interior volume 130 at the upper portion 132 of the interior volume 130, and the lower passage 114 may connect to the interior volume 130 at the lower portion 134 of the interior volume 130.

The pulsed compression reactor 100 may further comprise a spring piston 140 and/or a driver piston 150. The spring piston 140 and the driver piston 150 may be positioned within the interior volume 130 of the reactor housing 110. The driver piston 150 may comprise a first head 152 and a second head 154. The first head 152 and the second head 154 may be connected by a rod 156 such that the first head 152, the second head 154, and the rod 156 may form a unitary body. The first head 152, the second head 154, and/or the spring piston 140 may each have a cylindrical shape, such as a shape customary in the art for a piston. The rod 156 may also be cylindrical, and may have a lesser diameter than the first head 152 and/or the second head 154. The spring piston 140 may be positioned completely within the upper portion 132 of the interior volume 130, while the driver piston 150 may be positioned within both of the upper portion 132 and the lower portion 134 of the interior volume 130. For example, the first head 152 may be positioned within the upper portion 132 while the second head 154 may be positioned within the lower portion 134.

The positioning of the spring piston 140 and the driver piston 150 in the interior volume 130 may subdivide the interior volume 130 into a plurality of chambers, such as a gas spring buffer chamber 162, a reaction chamber 164, a primary driver chamber 166, and a secondary driver chamber 168. In such embodiments, the sizes of the spring piston 140, the driver piston 150, or both, may be complementary to the size of the interior volume 130. For example, as depicted in FIG. 2, the diameter of the spring piston 140 may be only slightly less than the diameter of the upper portion 132 of the interior volume 130. The spring piston 140 may slide upward to a mechanical stop 133, which may mechanically inhibit the upward motion of the spring piston 140 during operation. The diameter of the first head 152 may also be only slightly less than that of the upper portion 132 and the diameter of the second head 154 may be only slightly less than that of the lower portion 134 of the interior volume 130. As such, the spring piston 140 may be slidably engaged in the upper portion 132 of the interior volume 130, the first head 152 may be slidably engaged with the upper portion 132 of the interior volume 130, and/or the second head 154 may be slidably engaged with the lower portion 134 of the interior volume 130.

According to one or more embodiments, the portion of the interior volume 130 positioned between the interior volume 130 and the spring piston 140 may constitute the reaction chamber 164. That is, the interior volume 130, the spring piston 140, and the reactor housing 110 (e.g., the rotor 122) may at least partially define the perimeter of the reaction chamber 164. The gas spring buffer chamber 162 may be at least partially defined by the reactor housing 110 (e.g., the rotor 122) and the spring piston 140. The gas spring buffer chamber 162 may contain a fixed amount of gas throughout operation of the pulsed compression reactor 100 such that the spring piston 140 may have spring functionality as pressure builds up in the reaction chamber 164.

According to one or more embodiments, the perimeter of the primary driver chamber 166 may be defined by one or more of the reactor housing 110 (e.g., the rotor 122) and the driver piston 150 (e.g., the second head 154 of the driver piston 150). As shown in FIG. 1, in some embodiments, the pulsed compression reactor 100 may include symmetric reaction chambers, spring pistons (for example, a first spring piston 140 and a second spring piston 240), driver pistons (for example, a first driver piston 150 and a second driver piston 250), etc. Such a design may be desirable to minimize vibrations caused during operation of the pulsed compression reactor 100. In such embodiments, the two driver pistons 150 may define the perimeter of the primary driver chamber 166. However, in additional embodiments, only one driver piston 150 may be included in the pulsed compression reactor 100 and the bottom of the interior volume 130 may define the edges of the primary driver chamber 166.

The contour of the driver piston 150 and the interior volume 130 may form a secondary driver chamber 168. The perimeter of the secondary driver chamber 168 may be at least partially defined by the first head 152 of the driver piston 150, the second head 154 of the driver piston 150, the rod 156 of the driver piston 150, and the reactor housing 110 (e.g., the rotor 122). When the reactor housing 110 includes an upper portion 132 and lower portion 134 with different diameters, the volume of the secondary driver chamber 168 may change as the driver piston 150 is translated within the interior volume 130.

The spring piston 140 and/or the driver piston 150 may be translated within the interior volume 130. For example, in FIGS. 1 and 2, the spring piston 140 and/or the driver piston 150 may move in the vertical direction (i.e., up and down in FIG. 2). Such movement may be caused by pressure differences within the gas spring buffer chamber 162, the reaction chamber 164, the primary driver chamber 166, and/or the secondary driver chamber 168. As such, it should be understood that the chambers (such as the gas spring buffer chamber 162, the reaction chamber 164, the primary driver chamber 166, and/or the secondary driver chamber 168) may change position as the spring piston 140 and/or the driver piston 150 are translated along the path of the interior volume 130. It is noted that the upper passage 112 may be in fluid communication with either the reaction chamber 164 or the secondary driver chamber 168 depending upon the position of the driver piston 150. The lower passage 114 may remain in fluid communication with the primary driver chamber 166 at all times.

According to one or more embodiments, the pulsed compression reactor 100 may generally be operated by injecting gases (either reactants or other process gases) into the various chambers of the interior volume 130 via the upper passage 112 and lower passage 114. In embodiments, the pulsed compression reactor 100 may receive into the reaction chamber 164 a reactant gas through the upper passage 112 which may translate the spring piston 140 away from the driver piston 150. This may expand the volume of the reaction chamber 164. The pulsed compression reactor 100 may then receive into the primary driver chamber 166 a driver gas through the lower passage 114, which may translate the driver piston 150 towards the spring piston 140. This may reduce the volume of the reaction chamber 164 and causes increases in temperature and/or pressure in the reaction chamber 164. In one or more embodiments, gases in the secondary driver chamber 168 may pass out of the secondary driver chamber 168 through the upper passage 112 when the driver piston 150 is translated towards the spring piston 140. The produced product gas may then be passed from the reaction chamber 164 through the upper passage 112 once the reaction chamber 164 has been expanded (i.e., decompressed). The translation of the driver piston 150 in a direction away from the spring piston 140 (expanding the reaction chamber 164) may be caused or aided by a quench gas which is received into the secondary driver chamber 168 through the upper passage 112. As the driver piston 150 moves away from the spring piston 140, gases present in the primary driver chamber 166 may be expelled from the primary driver chamber 166 via the lower passage 114, lowering the pressure in the primary driver chamber 166 and causing contraction of its volume.

The operation of one or more embodiments of a pulsed compression reactor 100 is depicted in FIGS. 3-10. Each of FIGS. 3-10 includes an "A", "B", and "C" figure. FIGS. 3A-10A depict cross-sectional top views of the pulsed compression reactor 100 through the upper portion 132 of the interior volume 130 at the upper passage 112. FIGS. 3B-10B depict cross-sectional top views of the pulsed compression reactor 100 through the lower portion 134 of the interior volume 130 at the lower passage 114. FIGS. 3C-10C depict the piston positions at each phase of the rotation of the rotor 122. FIGS. 3C-10C depict lines "A" and "B" to show the planes of the cross-sectional views of FIGS. 3A-10A and 3B-10B, respectively. In each of FIGS. 3C-10C, the rotor 122 moves one "phase" equal to one-eighth of a rotation. As the rotor 122 spins, the upper passage 112 and the lower passage 114 align with different passages in the stator 124 allowing for fluid communication. Generally, arrows in FIGS. 3-10 depict the general flow of a process gas within the pulsed compression reactor 100. It is noted that the spring piston 140 and the driver piston 150 are not depicted in FIGS. 3A-10A and 3B-10B. It is also noted that the embodiments depicted herein include two upper passages 112 and two lower passages 114. However, other embodiments may include one, three, or even more upper passages 112 and/or lower passages 114. The existence of additional upper passages 112 or lower passages 114 may change the configuration of the passages of the stator 124 (e.g., the degree rotation for each phase), but the embodiments contemplated herein are not limited to a particular number of upper passages 112 or lower passages 114. In FIGS. 3A-10A and 3B-10B, circles at the end of passages in the stator 124 indicate entries/exits from the stator 124. For example, these circles may represent passages that lead to external supplies of processing gases, reactant gases, or product gasses.

Figure 3A:
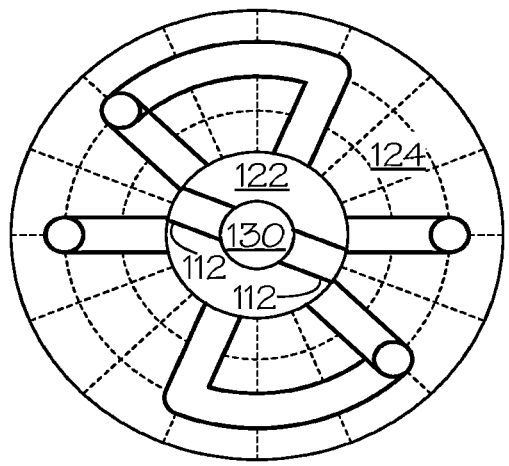
FIG. 3A schematically depicts a top cross-sectional view of the rotor and stator through the upper portion of the interior volume during a first phase of operation, according to one or more embodiments.
Figure 3B:
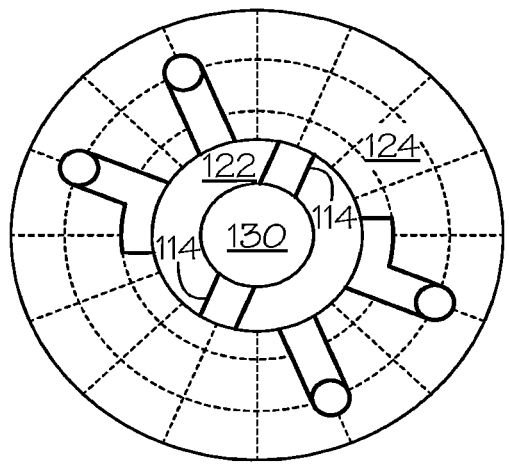
FIG. 3B schematically depicts a top cross-sectional view of the rotor and stator through the lower portion of the interior volume during the first phase of operation, according to one or more embodiments.
Figure 3C:
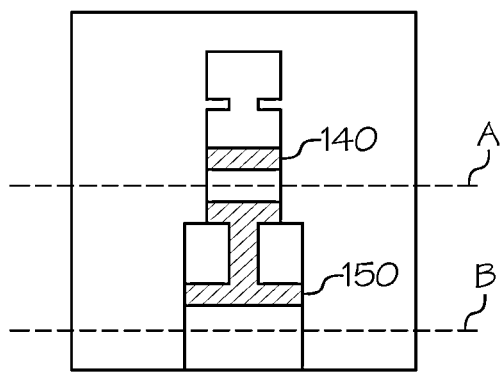
FIG. 3C schematically depicts a side view of the pulsed compression reactor showing the piston positions during the first phase of operation, according to one or more embodiments.

Now referring to FIGS. 3A, 3B, and 3C, the first phase of operation of the pulsed compression reactor 100 is depicted according to one or more embodiments. The upper passage 112 is not aligned with any of the passages of the stator 124 and the lower passage 114 is not aligned with any of the passages of the stator 124. The driver piston 150 is at its lowest position and the spring piston 140 is also at its lowest position.

Figure 4A:
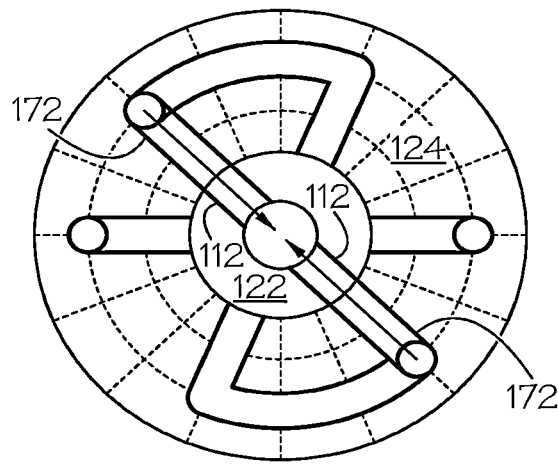
FIG. 4A schematically depicts a top cross-sectional view of the rotor and stator through the upper portion of the interior volume during a second phase of operation, according to one or more embodiments.
Figure 4B:
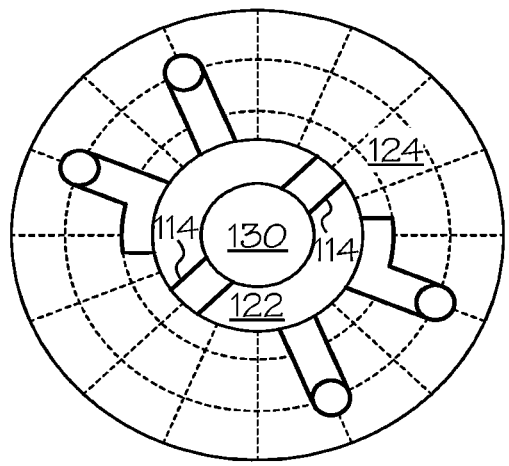
FIG. 4B schematically depicts a top cross-sectional view of the rotor and stator through the lower portion of the interior volume during the second phase of operation, according to one or more embodiments.
Figure 4C:
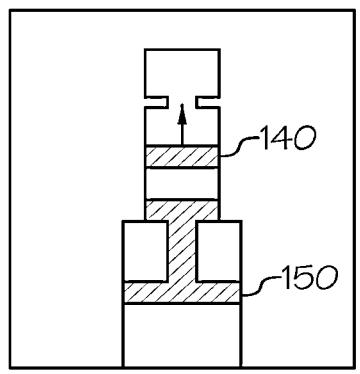
FIG. 4C schematically depicts a side view of the pulsed compression reactor showing the piston positions during the second phase of operation, according to one or more embodiments.

The second phase of operation is depicted in FIGS. 4A-4C, where the rotor 122 has rotated one-eighth of a rotation. In the second phase, the upper passage 112 may align with a reactant gas passage 172 of the stator 124. Alignment of the reactant gas passage 172 and the upper passage 112 may allow for reactant gas to flow into the reaction chamber 164 of the interior volume 130. While reactant gas is passed into the interior volume 130, the spring piston 140 may be pushed upward (i.e., in a direction away from the driver piston 150), causing expansion of the volume of the reaction chamber 164. The spring piston 140 may be a floating piston which moves to balance the pressures in the gas spring buffer chamber 162 and the reaction chamber 164 by adjusting their volumes. The second phase may be referred to as the filling phase of the operation of the pulsed compression reactor 100.

Figure 5A:
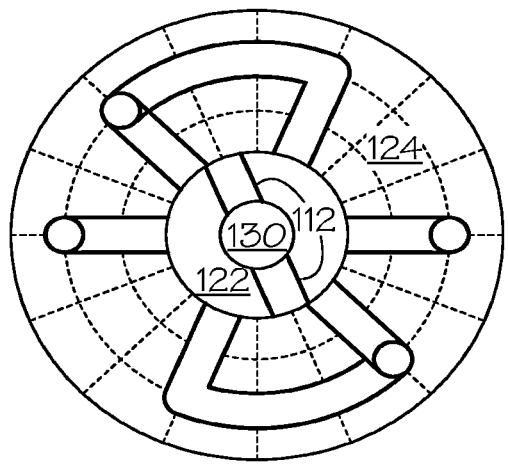
FIG. 5A schematically depicts a top cross-sectional view of the rotor and stator through the upper portion of the interior volume during a third phase of operation, according to one or more embodiments.
Figure 5B:
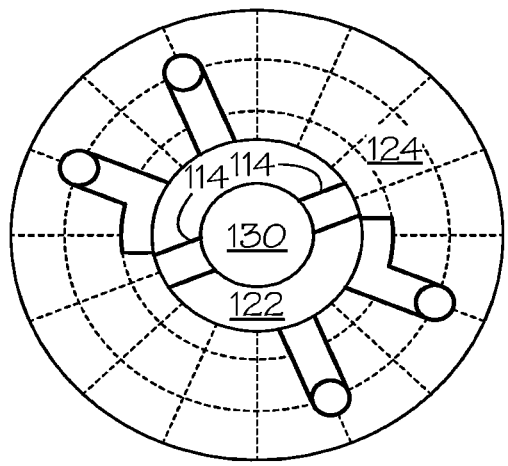
FIG. 5B schematically depicts a top cross-sectional view of the rotor and stator through the lower portion of the interior volume during the third phase of operation, according to one or more embodiments.
Figure 5C:
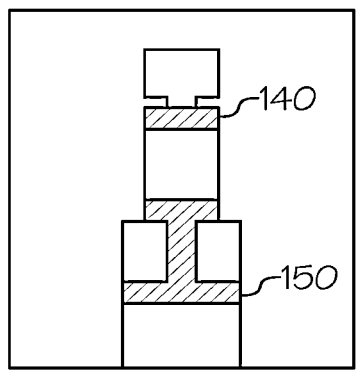
FIG. 5C schematically depicts a side view of the pulsed compression reactor showing the piston positions during the third phase of operation, according to one or more embodiments.

Now referring to FIGS. 5A-5C, the third phase is depicted. The spring piston 140 is at its most upward position, while the driver piston 150 has not moved relative the second phase. The reaction chamber 164 has its largest volume at this point. The upper passage 112 and the lower passage 114 are not aligned with any passages of the stator 124.

Figure 6A:
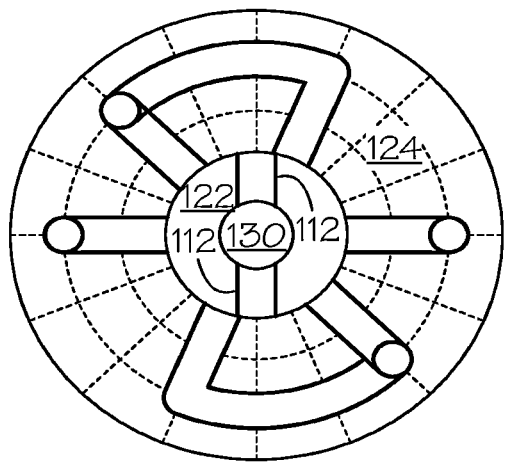
FIG. 6A schematically depicts a top cross-sectional view of the rotor and stator through the upper portion of the interior volume during a fourth phase of operation, according to one or more embodiments.
Figure 6B:
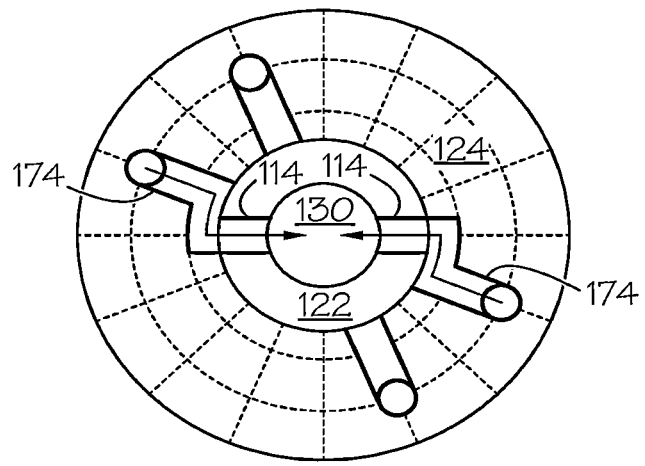
FIG. 6B schematically depicts a top cross-sectional view of the rotor and stator through the lower portion of the interior volume during the fourth phase of operation, according to one or more embodiments.
Figure 6C:
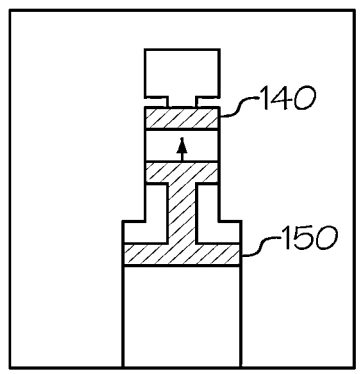
FIG. 6C schematically depicts a side view of the pulsed compression reactor showing the piston positions during the fourth phase of operation, according to one or more embodiments.

In a fourth phase, depicted in FIGS. 6A-6C, the lower passage 114 may be aligned with a driver gas inlet passage 174 of the stator 124. During alignment of the lower passage 114 of the rotor 122 and the driver gas inlet passage 174 of the stator 124, a driver gas may enter the primary driver chamber 168 of the interior volume 130. The driver gas may typically be any compressed gas such that its pressure is greater than that of the reaction chamber 164. In some embodiments, the driver gas may be compressed reactant or product gas. In other embodiments, the driver gas may comprise, without limitation, one or more of air, steam, or argon. The driver gas may fill the primary driver chamber 166 and drive the driver piston 150 upward (i.e., in the direction towards the spring piston 140).

Figure 7A:
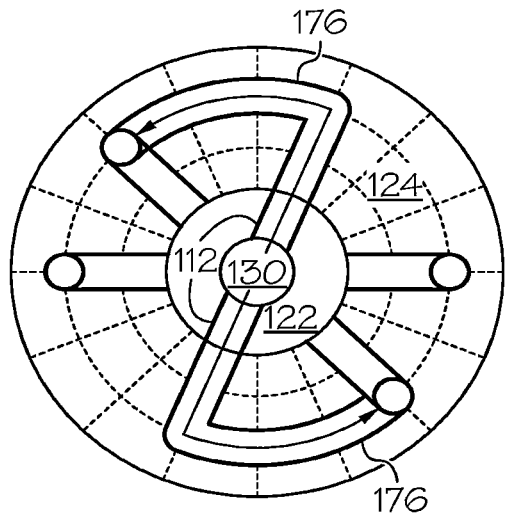
FIG. 7A schematically depicts a top cross-sectional view of the rotor and stator through the upper portion of the interior volume during a fifth phase of operation, according to one or more embodiments.
Figure 7B:
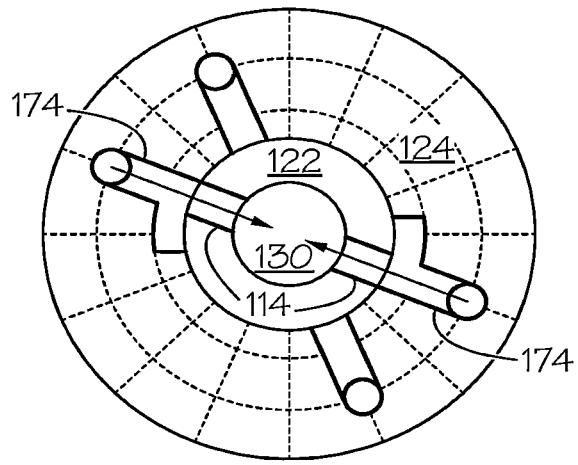
FIG. 7B schematically depicts a top cross-sectional view of the rotor and stator through the lower portion of the interior volume during the fifth phase of operation, according to one or more embodiments.
Figure 7C:
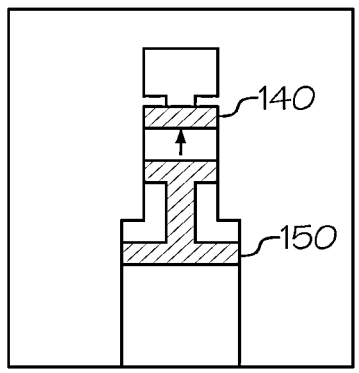
FIG. 7C schematically depicts a side view of the pulsed compression reactor showing the piston positions during the fifth phase of operation, according to one or more embodiments.

In the fifth phase, depicted in FIGS. 7A-7C, the lower passage 114 is also in alignment with the driver gas inlet passage 174 of the stator 124. As in the fourth phase, driver gas may enter the interior volume 130 via the driver gas inlet passage 174 of the stator 124 and the lower passage 114 of the rotor 122. During the fifth phase, the driver piston 150 may continue to translate in the direction of spring piston 140, reducing the volume of the reaction chamber 164. Additionally, in the fifth phase, the upper passage 112 may be in alignment with the gas release passage 176 of the stator 124. The fluid communication of the gas release passage 176 with the interior volume 130 may allow for evacuation of gasses from the secondary driver chamber 168 through the upper passage 112. The movement of the driver piston 150 allows for the upper passage 112 to be in fluid communication with the secondary driver chamber 168 rather than the reaction chamber 164 during the fifth phase. Evacuation of the gases in the secondary driver chamber 168 may allow for less resistance in the movement of the driver piston 150. This is caused by the geometry of the interior volume 130 and driver piston 150, where the volume of the secondary driver chamber 168 decreases as the driver piston 150 moves upwards.

Figure 8A:
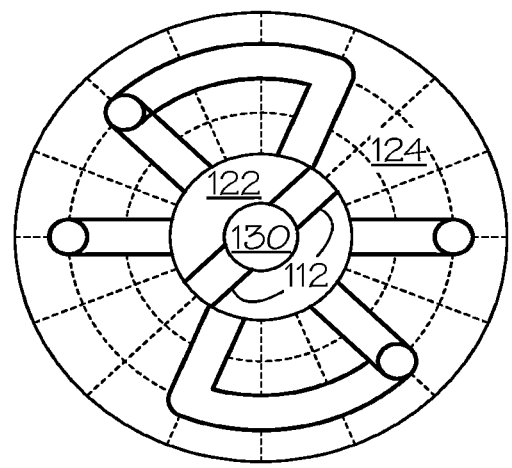
FIG. 8A schematically depicts a top cross-sectional view of the rotor and stator through the upper portion of the interior volume during a sixth phase of operation, according to one or more embodiments.
Figure 8B:
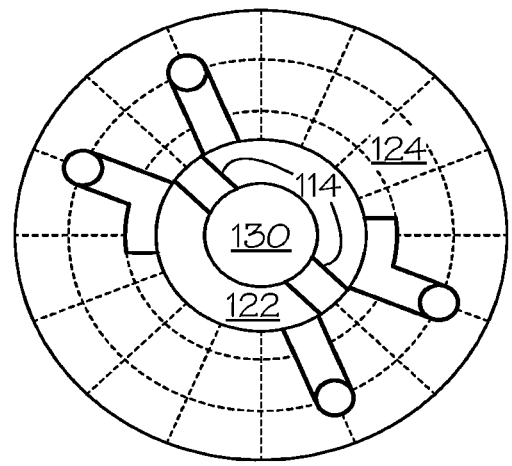
FIG. 8B schematically depicts a top cross-sectional view of the rotor and stator through the lower portion of the interior volume during the sixth phase of operation, according to one or more embodiments.
Figure 8C:
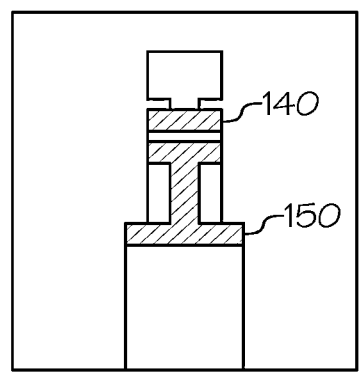
FIG. 8C schematically depicts a side view of the pulsed compression reactor showing the piston positions during the sixth phase of operation, according to one or more embodiments.

Now referring to FIGS. 8A-8C, the sixth phase is depicted. In the sixth phase the reaction chamber 164 is in a fully contracted state (i.e., its smallest volume), causing reaction conditions such as high temperature and high pressure conducive to chemical reaction. The spring piston 140 remains in its most upward position, and the driver piston 150 moves to its most upward position. It should be understood that in one or more embodiments, the pressure conditions, such as pressure equilibrium, of the one or more chambers stops the movement of the driver piston 150 (i.e., the driver piston 150 is not stopped by its contact with the top of the lower portion 134 of the interior volume 130. The volume of the reaction chamber 164 in the sixth phase (i.e., fully contracted) may be 10% or less, 5% or less, 1% or less, 0.5% or less, or even 0.1% or less than the volume of the reaction chamber 164 in the third phase (i.e., fully expanded). During the sixth phase, the upper passage 112 is not aligned with any passages in the stator 124 and the lower passage 114 is not aligned with any passages in the stator 124.

Figure 9A:
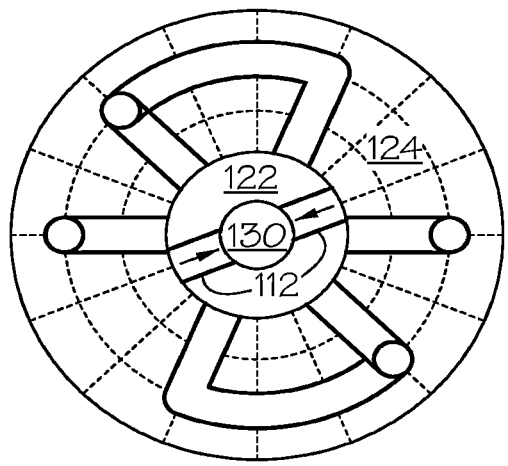
FIG. 9A schematically depicts a top cross-sectional view of the rotor and stator through the upper portion of the interior volume during a seventh phase of operation, according to one or more embodiments.
Figure 9B:
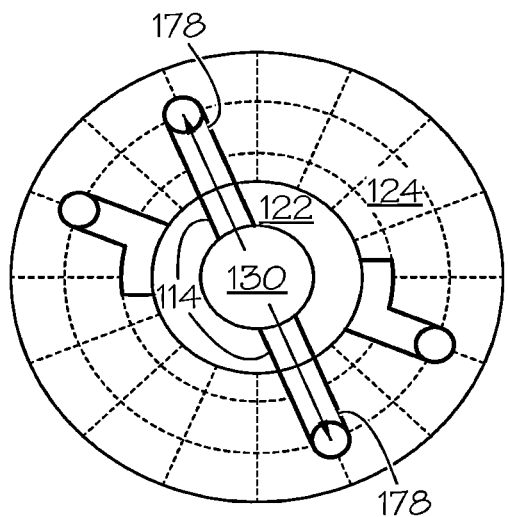
FIG. 9B schematically depicts a top cross-sectional view of the rotor and stator through the lower portion of the interior volume during the seventh phase of operation, according to one or more embodiments.
Figure 9C:
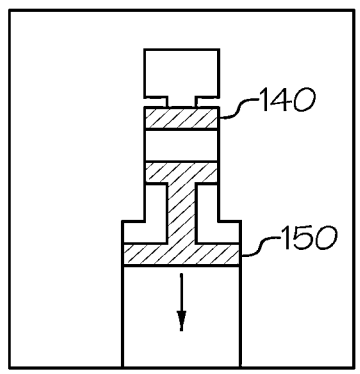
FIG. 9C schematically depicts a side view of the pulsed compression reactor showing the piston positions during the seventh phase of operation, according to one or more embodiments.
Figure 10A:
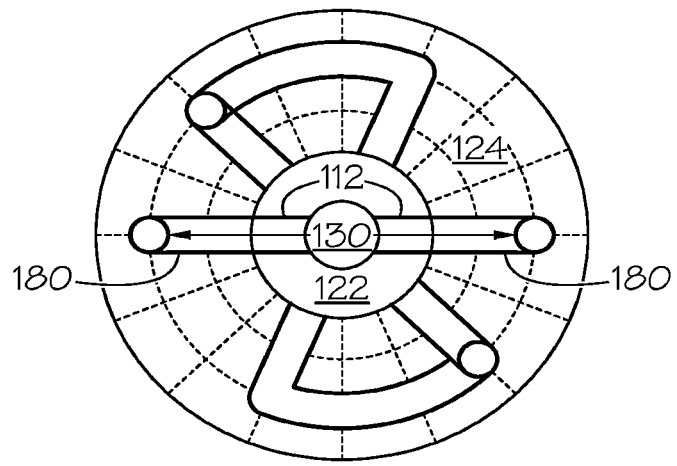
FIG. 10A schematically depicts a top cross-sectional view of the rotor and stator through the upper portion of the interior volume during a eighth phase of operation, according to one or more embodiments.
Figure 10B:
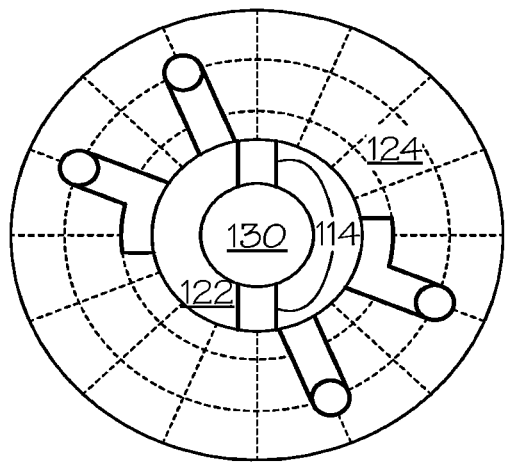
FIG. 10B schematically depicts a top cross-sectional view of the rotor and stator through the lower portion of the interior volume during the eighth phase of operation, according to one or more embodiments.
Figure 10C:
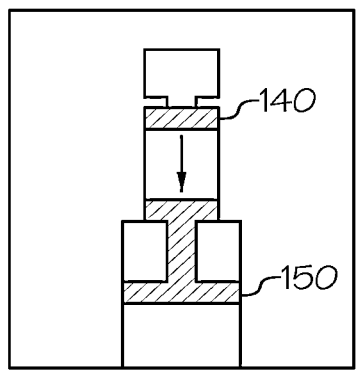
FIG. 10C schematically depicts a side view of the pulsed compression reactor showing the piston positions during the eighth phase of operation, according to one or more embodiments.

In the seventh phase, depicted in FIGS. 9A-9C, the lower passage 114 is aligned with a driver gas release passage 178 of the stator 124, while the upper passage 112 is not in alignment with any passages of the stator 124. During the seventh phase, sometimes referred to as the quench phase, the driver gas release passage 178 of the stator 124 allows for the evacuation of the driver gas from the primary driver chamber 166. The evacuation of the driver gas from the primary driver chamber 166 allows for the driver piston 150 to move in a direction away from the spring piston 140, thus expanding the reaction chamber 164. Additionally, during the seventh phase, gas stored in the upper passage 112 may pass into the secondary driver chamber 168, allowing for an easier downward translation of the driver piston 150.

In the eighth phase, which may be the final phase before recycling back to the first phase, the upper passage 112 is aligned with a product gas passage 180 of the stator 124, which evacuates the product gas from the reaction chamber 164. The lower passage 114 may not be aligned with any passages in the stator 124 during the eighth phase. The spring piston 140 may translate in the direction towards the driver piston 150 such that the spring piston 140 returns to its position in the first phase. The downward motion of the spring piston 140 (to the eventual position as shown in the first phase) may serve to at least partially evacuate the reaction chamber 164. This evacuation of product gases in the reaction chamber 164 may reduce the amount of mixing between product and reactant gases in the reaction chamber 164. Without being bound by theory, it is believed that lesser evacuation in the reaction chamber 164 following compressing (possibly causing increased mixing between the reactant stream and the product stream) may cause undesirable effects, such as, for example, product gases being reacted multiple times which may form unwanted secondary reactions. Processing a product of the reaction multiple times may decrease reaction selectivity, which may cause more expensive and energy intensive separation processes downstream of the pulsed compression reactor.

In one or more embodiments, the spring piston 140 and/or the driver piston 150 may operate at speeds of at least 1 Hz, at least 10 Hz, at least 100 Hz, or even at least 400 Hz. In embodiments, the rotor 122 may rotate as speeds of at least 1 Hz, at least 10 Hz, at least 100 Hz, or even at least 400 Hz. The operation of the pulsed compression reactor 100 may be controlled by the movement of the rotor 122, and the reaction may be started or stopped based on the starting or stopping of the rotation of the rotor 122.

According to one or more embodiments, the rotor 122 may spin in a direction and the one or more pistons of the pulsed compression reactor 100 (such as the spring piston 140 and/or the driver piston 150) may spin in the same direction. The spring piston 140 and/or the driver piston 150 may be gas lubricated (e.g., not requiring a liquid lubricant). The movement of the rotor 122 may cause the spring piston 140 and/or driver piston 150 to spin at an angular velocity about equal to that of the rotor 122. However, it has been observed that when the spring piston 140 and/or the driver piston 150 spin at the same angular velocity as the rotor 122, the rotor 122, the spring piston 140, or the driver piston 150 may experience increased wear that can eventually cause mechanical problems within the pulsed compression reactor 100 during operation. For example, increased ware may allow for gases to pass between the chambers (such as between the gas spring buffer chamber 162 and the reaction chamber 164, between the reaction chamber 164 and the secondary driver chamber 168, or between the primary driver chamber 166 and the secondary driver chamber 168). This gas leakage is undesirable because it may cause inefficiencies in the operation of the pulsed compression reactor 100.

According to one or more embodiments, the rotor 122 may be operated at a non-constant angular velocity. In such embodiments, the spring piston 140 and/or the driver piston 150 may not spin at the same rate as the rotor 122, avoiding mechanical degradation of those parts. For example, when the angular velocity of the rotor 122 changes, the spring piston 140 and/or the driver piston 150 may spin at a different velocity than the rotor 122 and cannot "catch up" to the angular velocity of the rotor 122. That is, without being bound by theory, it is believed that since the spring piston 140 and/or the driver piston 150 take some time to align spin with the rotor 122 (based at least in part on rotational inertia) that if the rotor 122 spins with a non-constant angular velocity the spring piston 140 and/or the driver piston 150 will have an angular velocity which trails that of the rotor 122. Various mechanical driving apparatuses may be utilized for translating the rotor 122 with a non-constant angular velocity. For example, and without limitation, a variable speed drive on an electro motor may be utilized to translate the rotor 122 with a non-constant velocity. As describe herein, non-constant velocity refers to velocity which changes within a rotor cycle. For example, at least one angular velocity within a cycle is different from at least one other angular velocity within that cycle. In one or more embodiments, the angular velocity of the rotor 122 may be sinusoidal. In additional embodiments, the angular velocity of the rotor 122 may be constant though a portion of a cycle and change to another constant angular velocity for another portion of the cycle.

According to one or more embodiments, the reaction gas may be selected from one or more of methane, nitrogen, carbon monoxide, or carbon dioxide. The conditions within the reaction chamber 164 may include high pressure and/or high temperature. For example, when the reaction chamber 164 has its smallest volume, the pressure in the reaction chamber 164 may be at least 50 MPa, at least 100 MPa, at least 200 MPa, or even at least 300 MPa, and/or the temperature may be at least 500° C., at least 1000° C., at least 2000° C., or even at least 3000° C. Product streams may include, without limitation, one or more of methane, ethylene, acetylene, linear hydrocarbons (such as C1-C8 including alkanes, alkenes, and/or alkynes), or hydrogen.

According to one or more embodiments, the reactant stream may comprise methane (such as at least 20 wt. %, at least 30 wt. %, at least 40 wt. %, at least 50 wt. %, at least 60 wt. %, at least 70 wt. %, at least 80 wt. %, at least 90 wt. %, at least 95 wt. %, or even at least 99 wt. % methane). The product stream produced from the methane-comprising reactant stream may comprise one or more of ethylene (e.g., from 2 wt. % to 30 wt. %), acetylene (e.g., from 2 wt. % to 30 wt. %), or linear hydrocarbons from C1-C8 (e.g., from 3 wt. % to 40 wt. %). Some methane may remain in the product stream (i.e., unconverted methane) in amounts of, for example, 10 wt. % to 40 wt. %. According to some embodiments, such as when methane is utilized as the reactant, the reaction may be endothermic. In some embodiments, the reaction may be endothermic and in other embodiments the reaction may be exothermic. The presently disclosed pulsed compression reactors may function under both types of reactions.

According to additional embodiments, a method for operation of a pulsed compression reactor 100 may comprise the movement of the valves and gases as described in relation to FIGS. 3-10. In embodiments, the method may include supplying or utilizing any of the embodiments of pulsed compression reactors 100 described herein. A method for the operation of a pulsed compression reactor 100 may include one or more of: (a) passing a reactant gas from the reactant gas passage 172 and through the upper passage 112 and into the reaction chamber 164 of the interior volume 130, which may cause the spring piston 140 to move in the direction opposite the driver piston 150; (b) passing a driver gas from the driver gas inlet passage 174 of the stator 124 and through the lower passage 114 and into the primary driver chamber 166 of the interior volume 130, which may cause the driver piston 150 to move in the direction towards the spring piston 140; (c) passing gas from the secondary driver chamber 168 of the interior volume 130 and through the upper passage 112 and into the gas release passage 176 of the stator 124, which may allow for less resistance in movement of the driver piston 150 in the direction towards the spring valve 140; (d) passing the driver gas from the primary driver chamber 166 of the interior volume 130 and through the lower passage 114 and into the release passage 178 of the stator 124, which may cause the driver piston 150 to move in the direction opposite the spring valve 140; and/or (e) passing a product gas from the reaction chamber 164 of the interior volume 130 and through the upper passage 112 and into the product gas passage 180 of the stator 124.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

The present application may include multiple non-limiting aspects which are presently described. According to a first aspect, a pulsed compression reactor may comprise a reactor housing defining an interior volume, the reactor housing comprising a first passage and a second passage which lead to the interior volume; a spring piston positioned within the interior volume, wherein the spring piston and the reactor housing at least partially define a perimeter of a gas spring buffer chamber within the interior volume; and a driver piston positioned within the interior volume, wherein the spring piston, the driver piston, and the reactor housing at least partially define a perimeter of a reaction chamber within the interior volume, and wherein the driver piston and the reactor housing at least partially define a perimeter of a primary driver chamber within the interior volume; wherein the pulsed compression reactor is operable to receive into the reaction chamber a reactant gas through the first passage, receive into the primary driver chamber a driver gas through the second passage which translates the driver piston towards the spring piston, and pass a reactant gas formed from the product gas from the reaction chamber through the first passage.

According to a second aspect, a pulsed compression reactor may comprise a reactor housing comprising a rotor and a stator, the rotor comprising an interior volume, wherein the rotor spins on a central axis of the reactor housing, and wherein the rotor comprises at least a first passage in fluid communication with the interior volume; and one or more pistons positioned in the interior volume and adapted to translate in the direction of the central axis; wherein the first passage aligns with one or more passages in the stator as the rotor spins on the central axis to allow for fluid communication between the stator and the interior volume.

According to a third aspect, a pulsed compression reactor may comprise a reactor housing comprising a rotor and a stator, the rotor comprising an interior volume, wherein the rotor spins on a central axis of the reactor housing, and wherein the rotor comprises at least a first passage in fluid communication with the interior volume; one or more pistons positioned in the interior volume and adapted to translate in the direction of the central axis; wherein the rotor spins in a direction and the one or more pistons spin in the same direction, and wherein the rotor spins at a non-constant velocity.

A forth aspect may include a pulsed compression reactor of any of the preceding aspects, wherein the spring piston translates in a direction away from the driver piston when the reaction chamber receives the reactant gas, such that the reaction chamber expands in volume.

A fifth aspect may include a pulsed compression reactor of any of the preceding aspects, wherein the driver piston translates in a direction towards the spring piston when the driver chamber receives the driver gas, such that the reaction chamber contracts in volume.

A sixth aspect may include a pulsed compression reactor of any of the preceding aspects, wherein the driver piston comprises a first head and a second head which has a greater diameter than the first head, the first head and second head connected by a rod, and wherein the first head, the second head, the rod, and the reactor housing at least partially define a perimeter of a secondary driver chamber within the interior volume.

A seventh aspect may include a pulsed compression reactor of any of the preceding aspects, wherein the interior volume comprises a cylindrical first portion and a cylindrical second portion adjacent the first portion, the first portion having a smaller diameter than the second portion, and wherein the first head of the driver piston is positioned within the first portion of the interior volume and the second head of the driver piston is positioned within the second portion of the interior volume.

An eighth aspect may include a pulsed compression reactor of any of the preceding aspects, wherein gases in the secondary driver chamber pass out of the secondary driver chamber through the first passage when the driver piston is translated towards the spring piston.

A ninth aspect may include a pulsed compression reactor of any of the preceding aspects, wherein the reactor is operable to receive into the secondary driver chamber a quench gas through the first passage.

A tenth aspect may include a pulsed compression reactor of any of the preceding aspects, wherein the driver piston translates in a direction away from the spring piston when the secondary driver chamber receives the quench gas, such that the reaction chamber expands in volume.

An eleventh aspect may include a pulsed compression reactor of any of the preceding aspects, wherein the spring piston translates in a direction towards the driver piston when the product gas is passed from the reaction chamber through the first passage such that the movement of the spring piston at least partially evacuates the product gas from the reaction chamber.

A twelfth aspect may include a pulsed compression reactor of any of the preceding aspects, wherein the stator comprises a reactant gas passage, and a reactant gas enters the interior volume when the reactant gas passage of the stator is aligned with the first passage of the rotor.

A thirteenth aspect may include a pulsed compression reactor of any of the preceding aspects, wherein the one or more pistons comprises a spring piston which is translated when the reactant gas enters the interior volume.

A fourteenth aspect may include a pulsed compression reactor of any of the preceding aspects, wherein the rotor comprises a second passage, and a driver gas enters the interior volume when the second passage of the stator is aligned with the driver gas inlet passage of the rotor.

A fifteenth aspect may include a pulsed compression reactor of any of the preceding aspect, wherein the one or more pistons comprises a driver piston which is translated when the driver gas enters the interior volume.

A sixteenth aspect may include a pulsed compression reactor of any of the preceding aspects, wherein the stator comprises a product gas passage and a product gas exits the interior volume when the product gas passage of the stator is aligned with the first passage of the rotor.

A seventeenth aspect may include a pulsed compression reactor of any of the preceding aspects, wherein the rotor comprises a second passage, and wherein the stator comprises a driver gas release passage and a driver gas exits the interior volume when the driver gas release passage of the stator is aligned with the second passage of the rotor.

An eighteenth aspect may include a pulsed compression reactor of any of the preceding aspects, wherein the one or more pistons spin at a non-constant velocity.

A nineteenth aspect may include a pulsed compression reactor of any of the preceding aspects, wherein the rotor comprises at least a first passage in fluid communication with the interior volume.

A twentieth aspect may include a pulsed compression reactor of any of the preceding aspects, wherein the first passage aligns with one or more passages in the stator as the rotor spins on the central axis to allow for fluid communication between the stator and the interior volume.

The invention claimed is:

1. A pulsed compression reactor comprising:
a reactor housing comprising a rotor and a stator, the rotor comprising an interior volume, wherein the rotor is configured to spin on a central axis of the reactor housing, and wherein the rotor comprises at least a first passage in fluid communication with the interior volume; and
one or more pistons positioned in the interior volume and adapted to translate in the direction of the central axis;
wherein the first passage aligns with one or more passages in the stator as the rotor spins on the central axis to allow for fluid communication between the stator and the interior volume;
wherein the stator comprises a reactant gas passage, and a reactant gas enters the interior volume when the reactant gas passage of the stator is aligned with the first passage of the rotor; and
wherein the one or more pistons comprises a spring piston which is configured to translate when the reactant gas enters the interior volume.

2. The pulsed compression reactor of claim 1, wherein the rotor comprises a second passage, and a driver gas enters the interior volume when the second passage of the rotor is aligned with a driver gas inlet passage of the stator.

3. The pulsed compression reactor of claim 2, wherein the one or more pistons comprises a driver piston which is configured to translate when the driver gas enters the interior volume.

4. The pulsed compression reactor of claim 1, wherein the stator comprises a product gas passage and a product gas exits the interior volume when the product gas passage of the stator is aligned with the first passage of the rotor.

5. The pulsed compression reactor of claim 4, wherein the rotor comprises a second passage, and wherein the stator comprises a driver gas release passage and a driver gas exits the interior volume when the driver gas release passage of the stator is aligned with the second passage of the rotor.

6. A pulsed compression reactor comprising:
a reactor housing comprising a rotor and a stator, the rotor comprising an interior volume, wherein the rotor is configured to spin on a central axis of the reactor housing, and wherein the rotor comprises at least a first passage in fluid communication with the interior volume;
one or more pistons positioned in the interior volume and adapted to translate in the direction of the central axis;
wherein the rotor is configured to spin in a direction and the one or more pistons is configured to spin in the same direction, and wherein the rotor is configured to spin at a non-constant velocity, such that the one or more pistons have an angular velocity which trails that of the rotor.

7. The pulsed compression reactor of claim 6, wherein the one or more pistons is configured to spin at a non-constant velocity.

8. The pulsed compression reactor of claim 6, wherein the first passage aligns with one or more passages in the stator as the rotor spins on the central axis to allow for fluid communication between the stator and the interior volume.

\* \* \* \* \*